March 10, 1936.	J. T. WORTHINGTON	2,033,167
ELECTRIC DEHYDRATOR
Filed Oct. 10, 1933
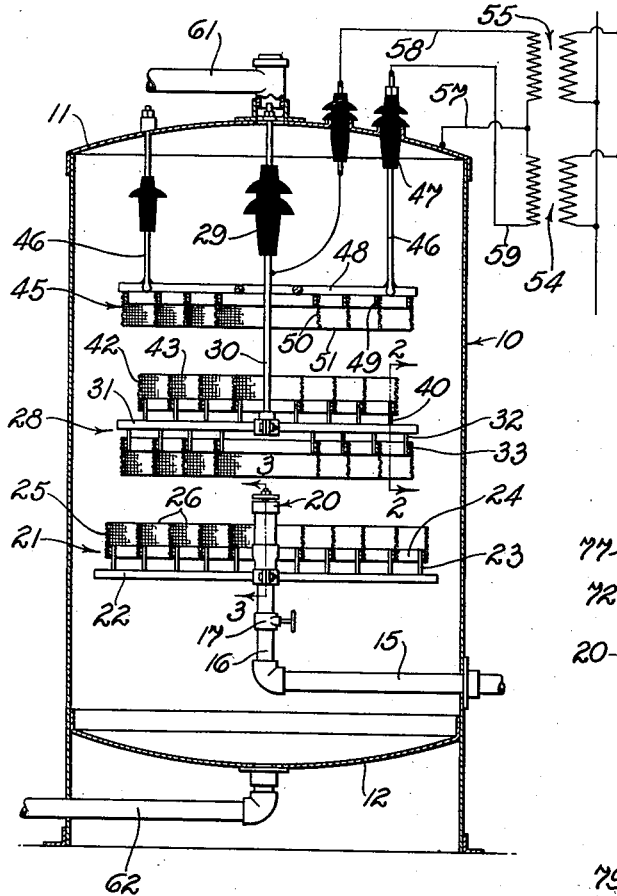
Fig.1.
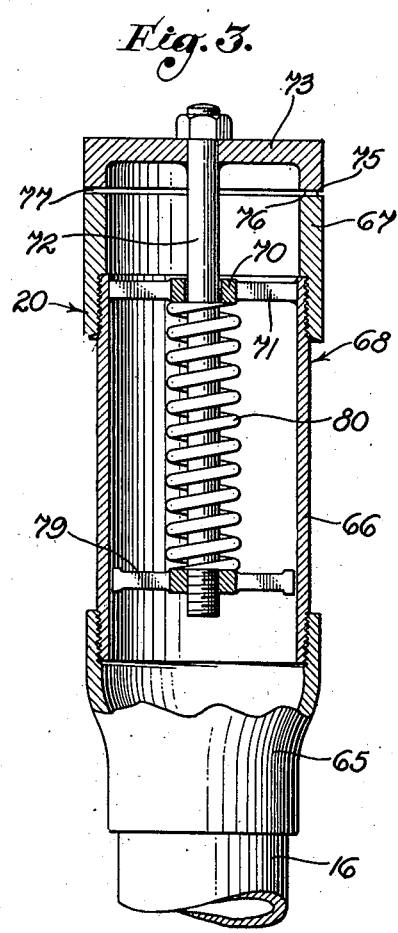
Fig.3.
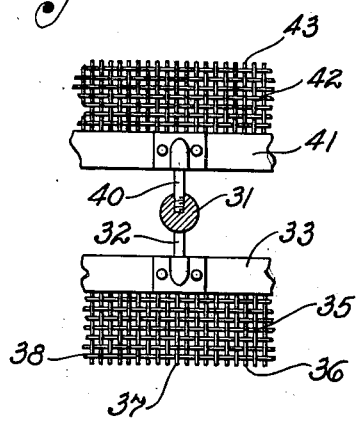
Fig.2.
INVENTOR:
John T. Worthington,
ATTORNEY.

Patented Mar. 10, 1936

2,033,167

UNITED STATES PATENT OFFICE 2,033,167

ELECTRIC DEHYDRATOR

John T. Worthington, Long Beach, Calif., assignor to Petroleum Rectifying Company of California, Los Angeles, Calif., a corporation of California Application October 10, 1933, Serial No. 692,955

10 Claims. (Cl. 204—24)

My invention relates to the art of electrical dehydration of emulsions, and more particularly to a treater of novel construction. In a copending application of Harold C. Eddy, filed February 7, 1933, Serial 655,556, there is disclosed a multiple-field treater using electrode structures each composed of concentric rings. The present improvements find particular utility with such a treater though they are in no sense limited thereto.

As disclosed in the application of Harold C. Eddy, supra, it is often desirable to utilize an electrode of saw-tooth characteristics so that the electric field adjacent the teeth is highly concentrated. It is an object of the present invention to provide an improved structure wherein such field concentration takes place, and for this purpose I utilize a screen electrode formed with a raw edge so that the field concentrates adjacent the most extended portions of this raw edge.

In practice it has been found that when an electric field is highly concentrated adjacent a point or sharp edge, the metal in this point or edge will be gradually removed due to the action of the electric field and the current flow. The result, of course, is that this action tends to remove the sharp projections after the treater has been in operation for a time. By using a screen electrode with a raw edge, the more extended portions of this raw edge tend to concentrate the field. These more extended portions are, of course, in the form of small wires, the field being concentrated adjacent the tip thereof. These tips will be gradually shortened after the treater has been in operation for some time, but the field intensity will not be substantially impaired. Even if the wires are shortened to such an extent that the field radiates from one of the transverse wires of the screen electrode, it will be clear that this wire will also be gradually removed and will thus expose new tips adjacent which the field can concentrate. Furthermore, if such a transverse wire becomes exposed, it may fall from the electrode structure due to the lack of mechanical support, and will be quickly destroyed by the high current flowing therethrough if it bridges between the electrodes or between any live electrode and the tank. It will thus be seen that the raw edge of the screen electrode presents a self-renewing surface adjacent which the field concentrates, this being another important feature of the present invention.

As disclosed in the application supra, it is often desirable to direct a radial flow of emulsion adjacent such a concentrated field, and it is an object of the present invention to provide a novel distributor means for thus introducing the emulsion into the treater.

A further object of the invention lies in the provision of a radially directed aperture of adjustable size.

One difficulty encountered when introducing emulsion into a dehydrator is that the velocity of the emulsion is dependent upon the pressure utilized. An excessive pressure will thus oftentimes direct the emulsion into the treater at excessive velocity so that the emulsion either passes through the field at too high a rate or tends to set up excessive agitation in the tank detrimental to the most efficient settling action. It is an object of the present invention to provide a novel fluid-introduction means which can be designed to maintain a substantially constant discharge velocity regardless of pressure, and which regulates the size of the discharge aperture in response to the quantity of emulsion flowing therethrough, and in response to the pressure of this emulsion.

Another object of the invention is to provide a dehydrator including a check valve means in the emulsion-introduction pipe.

Further objects and advantages of the invention will be made evident hereinafter.

Referring to the drawing,

Fig. 1 is a vertical sectional view of a treater including my improvements.

Fig. 2 is a sectional view taken on the line 2—2 of Fig. 1.

Fig. 3 is a vertical sectional view of the novel discharge means of the invention and is taken on the line 3—3 of Fig. 1.

The treater illustrated in Fig. 1 includes a tank 10 closed at its upper and lower ends by heads 11 and 12 respectively. The incoming emulsion is forced under pressure through an emulsion-introduction pipe 15 including a vertically extending pipe 16 with which a valve 17 is associated. The emulsion is then discharged in a radial stream from a distributor means 20 of the invention, which will be hereinafter described in detail.

The electrode structure of the treater includes a lower grounded electrode 21 supported on rods 22 mounted on the vertically extending pipe 16. Pins 23 extend upward from the rods 22 and mount a series of concentric rings 24 which in turn carry ring-shaped interstitial electrodes 25 preferably formed of screen and so cut that the upper edges 26 thereof are raw edges.

An intermediate electrode structure 28 is positioned above the lower electrode 21 and is suspended from an insulator 29 which carries a supporting member 30. Rods 31 extend outward from this supporting member, and downward depending pins 32 associated therewith carry a plurality of concentric rings 33, best shown in Fig. 2. Each of these rings has secured thereto an interstitial electrode 35 which is also of ring shape, the lower end 36 of which is cut to form a raw edge. Thus, the more extended portions of these interstitial electrodes are in the form of tips 37 formed by those wires of the metallic screen which extend from the rings 33. When an electric field is established between the raw edges 26 and 36 of the electrodes 21 and 28 respectively, the field will be highly concentrated adjacent these tips.

As previously mentioned, these tips will be gradually shortened as treatment progresses over long periods of time. However, this shortening will not change the concentrated nature of the field until these tips are shortened to the first cross-wire, indicated by the numeral 38 in Fig. 2. Even then the field will not be uniform, for it will still concentrate adjacent the ends of the tips 37, and the shortening action will continue until the cross-wire 38 is no longer sufficiently supported by these tips. At this time the cross-wire may drop and bridge between the electrodes 21 and 28 so as to set up a low resistance path therebetween. The current flowing through this wire is of such intensity that the wire is quickly destroyed. Once the wire 38 is removed, new tips are formed, and the field is highly concentrated thereadjacent. If the wire 38 is not released by the tips 37 as they are being shortened, the field will, of course, radiate from the wire 38. This wire being of small diameter, this field will be very intense and will itself act to remove the wire 38 by a gradual disintegration process. It will thus be clear that this type of electrode will renew its raw-edge characteristic from time to time as the treater is used. So, also, as the treater is being periodically drained it is possible for the operator to remove the cross-wire if it appears that the field is radiating therefrom as distinguished from the tips of the transverse wires.

Extending upward from the rods 31 are pins 40 carrying concentric rings 41, as best shown in Fig. 2. These rings also carry an interstitial electrode preferably in the form of a screen 42 of ring shape and terminating in an upper raw edge 43.

An upper electrode 45 is suspended on arms 46, one of which passes through an insulator bushing 47. Rods 48 are supported from these arms 46 and carry concentric rings 49, each of which mounts a ring shaped interstitial electrode 50. These interstitial electrodes are preferably formed as previously described and terminate in raw edges 51 which are spaced from the raw edges 43 of the intermediate electrode.

In the preferred embodiment it is preferable to ground the electrode 21 as shown and maintain the electrodes 28 and 45 at a potential above ground. The most desirable system includes transformers 54 and 55 each providing a secondary winding with one terminal grounded to the tank through a conductor 57. The remaining high potential terminal of the transformer 55 is connected by a conductor 58 to the supporting member 30 and thus to the intermediate electrode 28 so that this transformer sets up an electric field between the lower and intermediate electrodes 21 and 28. The remaining high potential terminal of the transformer 54 is connected by a conductor 59 to the arm 46 and thus to the upper electrode 45. This transformer thus acts to set up a potential between the tank and the upper electrode 45. In addition, the transformers 54 and 55 are connected in additive relation so that the potential between the upper electrode 45 and the intermediate electrode 28 will be substantially twice the potential between either of these electrodes and the grounded tank. The emulsion is first subjected to the field between the electrodes 21 and 28 where a preliminary treatment takes place, some of the water dropping to the lower portion of the tank and the drier emulsion moving upward into a much more intense field between the electrodes 28 and 45 where it is subjected to further treatment. Eventually the dry oil moves into the upper end of the tank and is removed through a pipe 61, while the water drops to the lower end and is removed through a pipe 62.

The emulsion-introduction system is an important feature of the invention and includes the distributor means 20, the details of which are best shown in Fig. 3. Referring to this figure, a nipple 65 connects the upper end of the vertically extending pipe 16 to a tubular member 66. This tubular member carries a seal member 67, being preferably threaded thereto, this seal member 67 and the tubular member 66 cooperating in providing a conduit means 68 through which the incoming emulsion flows.

A guide member 70 is mounted centrally in the tubular member 66 by means of arms 71 and serves to vertically journal a pin 72 secured to a control member 73 extending across the seal member 67 in the form of a cap. This control member is thus positioned in the path of flow of the emulsion. The seal member 67 and the control member 73 respectively provide walls 75 and 76 which are preferably formed to extend radially from the axis of the tubular member 66, these walls cooperating in defining an aperture 77 through which the emulsion moves in the form of a radial stream.

The lower end of the pin 72 carries a spider 79 which is vertically slidable in the tubular member 66 and serves to centralize the lower end of the pin 72. A spring 80 is compressed between the guide means 70 and the spider 79 and thus serves to resiliently move the control member 73 downward to decrease the size of the aperture 77. It is preferable to so form this distributor means 20 that this aperture may be entirely closed by the action of the spring 80, though this is not in all instances essential.

When the emulsion flows through the emulsion-introduction pipe 15 and through the conduit means 68 it comes into pressural engagement with the inner surface of the control member 73, thus tending to move this control member upward and thus increase the size of the aperture 77. The size of this aperture is thus dependent upon the pressure in the tubular conduit means 68 and thus upon the amount of emulsion supplied. When the pressure of the incoming emulsion increases, a wider stream of the emulsion is formed and by proper design the velocity of the emulsion discharged from the distributor means 20 can be substantially independent of the pressure variations on the incoming emulsion. If an aperture of fixed dimensions were utilized, an increase in the pressure would increase the velocity and thus decrease the time interval during which the incoming emulsion was subjected to the field between the lower electrode 21 and the intermediate electrode 28. So also, an increase in pressure with an aperture of fixed size would increase the discharge velocity to such an extent that the gravitational settling action of the water and oil in the tank 10 would be seriously interfered with.

Another feature of this distributor means 20 is that it will automatically close when no emulsion is flowing therethrough. It thus acts as a check valve to prevent any return flow through the emulsion-introduction pipe 15. This is often desirable in view of the relatively high pressures maintained in present-day dehydrators, and permits reconnecting the emulsion-introduction pipe to various sources without return flow which might occasion loss of constituents, not to mention the inconvenience of taking care of this drainage.

While I have illustrated the spring 80 as comprising the resilient means, other means, of course, might be utilized. Thus, it is possible to use a gravity-operated system wherein the weight of the control member and its associated structures is sufficient to set up this resilient action. Nor am I limited to the particular placement of the elements as shown in Fig. 3, for in some instances it is possible to design the distributor 20 so that the spring 80 is outside of the conduit means rather than being positioned therein.

So, also, it is not essential to the utility of the present invention that the aperture 77 be of radial form. Other types of apertures may be utilized, dependent upon the electrode structure with which the distributor means is to be used.

I claim as my invention:

1. In an electric treater for treating petroleum emulsions, the combination of: a first electrode; a second electrode extending toward said first electrode, said electrodes being formed of metallic screen cut with raw edges which extend toward but spaced from each other; means for impressing a potential difference between said electrodes to set up an electric field therebetween which field is highly concentrated at said raw edge; and means for introducing the emulsion to be treated into said electric field.

2. A combination as defined in claim 1 in which each of said electrodes is in the form of a closed ring, said raw edges extending substantially completely therearound, said rings being in alignment about a common axis and said raw edges being spaced from each other along said axis.

3. In an electric treater for treating petroleum emulsions, the combination of: a ring; an interstitial metallic member secured to said ring and extending away therefrom, said interstitial member being of ring shape and the portion thereof most extended from said ring being cut to form a raw edge whereby certain portions of said interstitial member extend further from said ring than other portions thereof; means for establishing an electric field adjacent said raw edge whereby said field is concentrated adjacent said most extended portions; and means for introducing the emulsion to be treated into said electric field.

4. In an electric treater for treating petroleum emulsions, the combination of: a tank; means for setting up an electric field in said tank; an emulsion-introduction pipe extending into said tank; walls defining an aperture communicating with the interior of said emulsion-introduction pipe and projecting a stream of emulsion directly into and along said field so that it is treated by said electric field; and means for changing the size of said aperture in response to the amount of emulsion flowing therethrough.

5. In an electric treater for treating petroleum emulsions, the combination of: a tank; means for setting up an electric field in said tank; conduit means in said tank; means for supplying emulsion to said conduit means; a control member movably mounted adjacent said conduit means and cooperating therewith in defining an aperture projecting a stream of emulsion into and along said electric field, the cross-sectional area of said aperture increasing when said control member is moved relative to said conduit means; and resilient means associated with said conduit means and said control member and permitting resilient movement therebetween to change the size of said aperture in response to the amount of emulsion flowing therethrough.

6. A combination as defined in claim 5 in which said control member is in the form of a cap extending across said conduit means and acted upon by the emulsion flowing therethrough.

7. In an electric treater for treating petroleum emulsions, the combination of: a tank; means for setting up an electric field in said tank; conduit means in said tank; a control member adjacent said conduit means and cooperating therewith in defining an aperture discharging a stream of emulsion directly into and along said electric field; a pin on said control member; means for slidably mounting said pin to move said control member relative to said conduit means; and means for supplying emulsion to said conduit means in pressure-transferring relationship with said control member whereby the size of said aperture changes in response to the amount of emulsion entering said conduit means.

8. A combination as defined in claim 7 including a resilient means forcing said control member toward a position wherein said aperture is of minimum size.

9. In an electric treater for treating petroleum emulsions, the combination of: a tank; means for setting up an outward-extending electric field in said tank; an emulsion-introduction pipe extending into said tank; a pair of walls extending outward from the axis of said emulsion-introduction pipe and cooperating to form an outwardly-directed aperture discharging a stream of emulsion flowing directly into and along said field; means for movably mounting one of said walls whereby movement thereof changes the size of said aperture; and means for moving said one of said walls in response to the pressure of the emulsion in said pipe.

10. In combination in an electric treater: a tank; means for setting up an electric field in said tank; an emulsion-introduction pipe carrying emulsion under pressure; walls forming a variable-area discharge aperture communicating with said emulsion-introduction pipe and delivering a stream of emulsion directly into and along said electric field; and means for increasing the area of said discharge aperture in response to increase of pressure of said emulsion in said emulsion-introduction pipe to maintain the velocity of said stream substantially constant regardless of pressure variations in said emulsion-introduction pipe.

JOHN T. WORTHINGTON.